(12) United States Patent
Tan

(10) Patent No.: US 9,845,983 B2
(45) Date of Patent: Dec. 19, 2017

(54) CENTRAL AIR-CONDITIONING SYSTEM AND CONTROL METHOD THEREOF

(71) Applicant: Zhongxi Tan, Guangshou (CN)

(72) Inventor: Zhongxi Tan, Guangshou (CN)

(73) Assignee: Zhongxi Tan, Guangzhou (CN)

( * ) Notice: Subject to any disclaimer, the term of this patent is extended or adjusted under 35 U.S.C. 154(b) by 511 days.

(21) Appl. No.: 14/390,709

(22) PCT Filed: Jan. 17, 2013

(86) PCT No.: PCT/CN2013/070617
§ 371 (c)(1),
(2) Date: Oct. 3, 2014

(87) PCT Pub. No.: WO2013/149507
PCT Pub. Date: Oct. 10, 2013

(65) Prior Publication Data
US 2015/0089963 A1    Apr. 2, 2015

(30) Foreign Application Priority Data

Apr. 6, 2012  (CN) .......................... 2012 1 0101216

(51) Int. Cl.
*F24F 11/02*    (2006.01)
*F25D 17/02*    (2006.01)
(Continued)

(52) U.S. Cl.
CPC ............ *F25D 17/02* (2013.01); *F24F 11/008* (2013.01); *F25D 29/00* (2013.01);
(Continued)

(58) Field of Classification Search
CPC ...... F24F 1/0007; F24F 5/0003; F24F 11/008; F24F 2001/0074; F24F 2001/0077;
(Continued)

(56) References Cited

U.S. PATENT DOCUMENTS 3,165,148 A * 1/1965 Soule ...................... F24F 3/001
                                                    165/211
3,384,155 A * 5/1968 Newton .................... F24F 3/06
                                                    165/208
(Continued)

FOREIGN PATENT DOCUMENTS

CN    101256020 A    9/2008
CN    102062459 A    5/2011
(Continued)

OTHER PUBLICATIONS

International Search Report dated Mar. 28, 2013, issued in corresponding International Applciation No. PCT/CN2013/070617.

*Primary Examiner* — Jonathan Bradford
(74) *Attorney, Agent, or Firm* — Westerman, Hattori, Daniels & Adrian, LLP

(57) ABSTRACT

In a central air-conditioning system, regional flow balancing valves for controlling flow of water return branch pipes are arranged on the water return branch pipes, and energy balancing valves are arranged on water return pipes of tail-end fan coils respectively. A control method includes: detecting flow in the water return branch pipes, and adjusting the flow in the return branch pipes to be smaller than or equal to a branch pipe set flow value; and detecting the temperature of return water in the water return pipes of the tail-end fan coils, controlling the temperature of the return water in the water return pipes of the tail-end fan coils to be greater than or equal to a tail-end return water set temperature value, detecting the room temperature and adjusting the opening degree of the energy balancing valves in temperature controllers.

10 Claims, 6 Drawing Sheets

(51) Int. Cl.
*F24F 11/00* (2006.01)
*F25D 29/00* (2006.01)
*F24D 11/02* (2006.01)
*F24D 19/10* (2006.01)

(52) U.S. Cl.
CPC ...... *F24D 11/0214* (2013.01); *F24D 19/1015* (2013.01); *F24D 2220/2027* (2013.01); *Y02B 30/126* (2013.01)

(58) Field of Classification Search
CPC ....... F24F 2011/0045; F24F 2011/0082; F24F 2011/0083
See application file for complete search history.

(56) References Cited

U.S. PATENT DOCUMENTS

| | | | | |
|---|---|---|---|---|
| 3,608,625 | A * | 9/1971 | Kendrick | F24D 11/0214 165/104.31 |
| 6,298,677 | B1 * | 10/2001 | Bujak, Jr. | F24F 3/06 165/208 |
| 7,730,935 | B1 * | 6/2010 | Bujak, Jr. | F24F 3/06 165/208 |
| 8,261,565 | B2 * | 9/2012 | Borror | F25B 23/006 62/113 |
| 2004/0188082 | A1 * | 9/2004 | Riello | F24F 3/06 165/219 |
| 2006/0107683 | A1 * | 5/2006 | Song | F24F 3/06 62/324.1 |
| 2010/0108293 | A1 * | 5/2010 | Tan | G05D 11/132 165/96 |
| 2011/0301766 | A1 * | 12/2011 | Higgins | G06Q 10/06 700/282 |
| 2012/0031605 | A1 * | 2/2012 | Takayama | F24F 11/008 165/201 |
| 2015/0089963 | A1 * | 4/2015 | Tan | F25D 29/00 62/56 |

FOREIGN PATENT DOCUMENTS

| | | |
|---|---|---|
| CN | 102607146 A | 7/2012 |
| CN | 202581682 U | 12/2012 |
| JP | 9-166346 A | 6/1997 |
| JP | 10-132331 A | 5/1998 |
| JP | 10-318584 A | 12/1998 |

* cited by examiner

CENTRAL AIR-CONDITIONING SYSTEM AND CONTROL METHOD THEREOF

FIELD OF THE INVENTION

The present invention relates to a balance control technology for a central air-conditioning system, and in particular relates to a water balance control technology for a heating, ventilation and air-conditioning system.

BACKGROUND OF THE INVENTION

The main object of setting a central air-conditioning system is to obtain a comfortable indoor environment, and common central air-conditioning systems mostly adopt circulating water pipelines arranged in a direct return transmission and distribution manner, so that the following several problems always emerge in use: 1, the required temperature can not be always obtained in all tail-end rooms, and particularly after the local tail-end heat load is changed, the temperature can not be timely adjusted to the required temperature; 2, even if a cold or heat production device has enough capacity, a phenomenon of heat unevenness still appears in the system; 3, when the room temperature reaches a required value, the output of a tail end still continuously oscillates; 4, water hammer sound always appears in rooms near a water supply main pipeline; and 5, the rooms have over cold or annoying blowing feeling sometimes. Emergence of these problems not only leads to poor comfortableness, but also leads to increase of the energy consumption of the system. The system with relatively satisfying running condition still consumes more energy by 40%. The reason mainly lies in that the flow required by a tail-end device connected to a pipeline and the water resistance at each position in the pipeline are different and have great influence on the practical flow distribution, so that water flow can not be reasonably distributed to the whole water circulating system, the problem of water flow imbalance exists, and the "overflow" phenomenon of a device close to the water supply main pipeline leads to an "underflow" phenomenon in a device away from the water supply main pipeline. Therefore, in order to improve the comfortableness and achieve the maximum energy-saving effect, a flow balance control must be performed on a circulating water loop.

To compensate the pressure drop in the circulating water pipeline and achieve the effect of balancing system pressure, a water circulating loop adopting a reverse return transmission and distribution manner (there are three transmission and distribution pipes) emerges. The distances that water supply and return main pipes pass by are basically equal due to this manner, namely the consumed on-way resistances are basically identical, so that the resistance of each loop is basically balanced. However, compared with the direct return transmission and distribution manner, the length of the water return main pipe is increased, more time, labor and materials are consumed, part of investment cost is increased and the loss of energy is undoubtedly produced due to the added pipelines in such an arrangement manner. Moreover, because it can not be ensured that all pipe sections have the same pressure drop in the constructed practical engineering, the practical differential pressures are inconsistent.

Aiming at the above-mentioned problems, a method for controlling the circulation of a central air-conditioning water system by using a differential pressure balancing method is proposed, wherein differential pressure balancing valves are additionally arranged based on reverse return transmission and distribution, adjust the opening degrees of the valves by using the differential pressure effect and compensate the resistance change of pipelines by using the pressure drop change of valve elements, so that the differential pressure of the controlled system may be controlled to be constant within a certain flow range, and the differential pressure may be basically unchanged when the working condition is changed. By adopting such a manner, blocking is likely to occur in the differential pressure balancing valves, and each differential pressure balancing valve needs to be debugged, so that the debugging operation of the whole system is relatively complex, and the requirement for experiences of debugging persons is high; and the debugging operation is performed in a static state, and the resistance of each differential pressure balancing valve is relatively fixed after debugging and can not adapt to the change of the load of the system at any time, so that the balance of the system can not be ensured all the time. Moreover, the system is generally debugged with water of 20° C., common water runs normally at 7° C.-12° C. when cold is supplied, and the originally obtained hydraulic balance may be maintained; however, for the water containing 30% of ethylene glycol, the pressure loss of the pipelines under the working condition of 7° C.-12° C. is 4% more than that at 20° C.; and during heating, the average water temperature reaches 60° C., the pressure loss of the pipelines roughly declines by 15%, and the pipeline water resistance is reduced, so that the original balance is broken.

Aiming at the problems of the differential pressure balancing method, flow balance control methods emerge in recent years, and a flow balancing valve is additionally arranged at each tail end of the reverse return transmission and distribution system, so that the flow flowing through the tail end may be directly set according to the design, the flow deviation caused by residual pressure heads and pressure fluctuation of the pipelines is automatically eliminated, the set flow of the tail end may be kept unchangeable no matter how the pressure of the system is changed, the flow adjustment of a pipe network is completed at one time, the debugging operation is changed into simple flow distribution, and thus the hydraulic imbalance problem of the pipe network is effectively solved. The flow of each tail-end unit may be kept consistent through arrangement of the flow balancing valve, so as to solve the original problem that the system is difficult to balance due to many pipelines, inaccurate static balance and the influence of water temperature.

When the flow balancing valve is arranged at the tail end of the system, the set value under the control of the valve is selected according to the design load of the tail-end unit, namely the maximum flow of the flow balancing valve is a passable flow under the condition that the tail-end unit where the flow balancing valve is located is at the maximum design load. The flow balancing valve mainly plays a role in limiting the flow in practical use, and once the required load of the tail-end unit exceeds the original designed maximum load, the flow of a coolant flowing through the tail-end unit is no longer increased, so that the comfortableness declines, and the allocation of energy within a region can not be realized.

Thus it could be seen that selecting an appropriate central air-conditioning device and control method plays an important role in simultaneously meeting the comfortableness and the energy-saving effect.

SUMMARY OF THE INVENTION

The object of the present invention is to provide a central air-conditioning system capable of effectively realizing comfortableness and energy saving and a control method thereof.

According to a technical solution of the present invention, a central air-conditioning system includes a refrigerating unit, a cooling water loop, a cooling water pump arranged on the cooling water loop, a cooling water pump frequency converter, a circulating water loop, a circulating water pump arranged on the circulating water loop, a circulating water pump frequency converter, a plurality of circulating water branches arranged in parallel on the circulating water loop, as well as temperature controllers, tail-end fan coils, fresh air units and air handling units arranged in rooms, the circulating water loop includes a water inlet manifold and a water return manifold, and each circulating water branch includes a water inlet branch pipe and a water return branch pipe, the tail-end fan coils, the fresh air units and the air handling units are arranged in parallel on the circulating water branches respectively; a regional flow balancing valve for controlling the flow of each water return branch pipe is arranged on each water return branch pipe, and an energy balancing valve is arranged on a water return pipe of each tail-end fan coil and respectively receives signals output by the temperature controller and a tail-end return water temperature sensor which is arranged on the water return pipe of the tail-end fan coil.

A plurality of circulating water branches are arranged in parallel on the circulating water loop, e.g. a circulating water branch is arranged on each floor of a place using the central air-conditioning system such as a multilayer hotel or an office, the tail-end fan coil, the fresh air unit and the air handling unit in each room are arranged in parallel on the circulating water branch, the distances between different circulating water branches and the outlet of the circulating water pump are different, the flow of return water flowing through each circulating water branch may be automatically detected by arranging the regional flow balancing valve on the circulating water branch, and the opening degree of each regional flow balancing valve is adjusted according to the branch pipe set flow value, so that the flow of each circulating water branch is controlled to not exceed the branch pipe set flow value, the effect of quantifying the maximum supply within a certain regional range is achieved, the contradictions of large differential pressure at the proximal end and small differential pressure at the distal end may be effectively solved, thus the use level of circulating water for the system is reduced on the whole, the frequency conversion may be performed on the circulating water pump timely, and the energy is effectively saved; the energy balancing valve arranged on each tail-end fan coil may timely adjust the energy supply at the tail end according to a tail-end return water set temperature value and a room temperature set value, and no matter how the heat load in the tail end is changed, the design requirements may be met by constant return water temperatures of the fresh air units and the air handling units, so that the heat exchange efficiency at the tail end is the highest, the load demand may be just met, heat supply and demand may also be timely transferred, and therefore the comfortableness at the tail end is improved. By combining the regional flow balancing valves and the tail-end energy balancing valves, the requirement for comfortableness at the tail end may be ensured, the characteristic of variable load at the tail end may be adapted, the heat load is timely transferred within a certain region, the flow allocated to the region does not exceed a design value, and the effects of comfortableness and energy saving are achieved.

Energy balancing valves are arranged on the water return pipes of the fresh air units and the air handling units and respectively receive signals output by the temperature controllers and tail-end return water temperature sensors arranged on the water return pipes of the fresh air units and the air handling units. The energy supply at the fresh air units and the air handling units may be timely adjusted according to tail-end return water temperature and room temperature requirements, and no matter how the heat loads at the tail ends are changed, the design requirements may be met by constant return water temperatures of the fresh air units and the air handling units, so that the heat exchange efficiency at the tail ends is the highest, the load demand may be just met, and the heat supply and demand may also be timely transferred.

Branch pipe return water temperature sensors are arranged on the water return branch pipes, and the regional flow balancing valves receive signals output by the branch pipe return water temperature sensors. The regional flow balancing valves may further receive water temperature adjustment on the basis of flow limitation, and may improve the adjustment efficiency, shorten the time for achieving a balance and then save the energy when the heat load is transferred between different circulating water branches.

Tail-end flow balancing valves for controlling return water flow are arranged on the water return pipes of the fresh air units and the air handling units and respectively receive signals output by the temperature controllers and tail-end return water temperature sensors arranged on the water return pipes of the fresh air units and the air handling units. The fresh air units and the air handling units belong to large-sized units, have high water consumption and have a serious problem of static hydraulic imbalance; the tail-end flow balancing valves are arranged on the water return pipes, so that the maximum flow flowing through these large-sized tail-end devices may be limited, and redundant water may be saved; and the return water temperature is adjusted on the basis of maximum limitation, so that the best balancing effect is realized.

According to another technical solution of the present invention, a control method for the central air-conditioning system of claim 1 includes the following steps which are performed simultaneously or sequentially: a, detecting the flow in each water return branch pipe, and adjusting the opening degree of each regional flow balancing valve according to a branch pipe set flow value, so that the flow in the water return branch pipe is smaller than or equal to the branch pipe set flow value; and b, detecting return water temperature in a water return pipe of each tail-end fan coil, adjusting the opening degree of each energy balancing valve according to a tail-end return water set temperature value, detecting the room temperature after the return water temperature in the water return pipe of each tail-end fan coil is greater than or equal to the tail-end return water set temperature value, and adjusting, by each temperature controller, the opening degree of each energy adjusting valve.

According to the characteristics that the central air-conditioning system itself has different circulating water branches and tail ends, the regional flow balancing valves for branch flow control are arranged on the circulating water branches respectively, namely each branch runs under the maximum flow limitation; when the water quantity required in a branch is increased, the opening degree of the regional flow balancing valve is increased to increase the flowing water quantity but not exceed a design value; when the water quantity required in the branch is reduced, the opening degree of the valve may be kept unchanged, the water pressure of the circulating water loop may rise at the moment, and then the circulating water pump frequency converter acts to reduce the flow of the circulating water, or because the quantity of water flowing through the valve is increased due to the rise of the water pressure, the valve acts to reduce the opening degree to ensure that the flowing water quantity does not exceed the maximum value, so that quantified supply can be effectively realized, and the flow and pressure in a region tend to be in a stable state; each tail-end fan coil is a main place for heat exchange, and when the heat load is changed, the return water temperature is most obvious; the return water temperature is used as a main control object, the return water temperature is controlled by the energy balancing valve to be greater than or equal to the set value, then the indoor temperature is adjusted through the indoor temperature controller to meet the requirement of different comfortableness, the flowing water quantity may be quickly reduced when the heat load is reduced so as to improve the adjusting efficiency, and the opening degree of the energy balancing valve may be increased through the setting of the temperature controller when the heat load is increased to increase the water quantity, so as to improve the comfortableness. Through two kinds of temperature control in each tail-end device, the change of the heat load may be timely and effectively tracked, quick and effective adjustment may be realized, and the local comfortableness may be realized; each branch pipe is subjected to regional flow control, so that the phenomenon of heat unevenness caused by the water pressure difference of distal and proximal end branch pipes and by the hydraulic resistance may be eliminated, and the heat load transfer in each region or between regions may also be fast balanced; and dynamic debugging of the system may be conveniently realized in a manner of giving the set value, so that the design and construction operation are simplified, the system is convenient to debug, the energy consumption is reduced, and the economic benefit is improved.

Step b further includes step b1: detecting return water temperature in the water return pipe of each of the fresh air units and the air handling units, adjusting the opening degree of each energy balancing valve according to the tail-end return water set temperature value, detecting the room temperature after the return water temperature in the water return pipe of each of the fresh air units and the air handling units is greater than or equal to the tail-end return water set temperature value, and adjusting, by each temperature controller, the opening degree of each energy adjusting valve. The fresh air units and the air handling units are large-sized heat exchange units and have large energy demands; the return water temperature is used as a main control object, the return water temperature is controlled by the energy balancing valve to be greater than or equal to the set value, then the indoor temperature is adjusted through the indoor temperature controller to meet the requirement of different comfortableness, the flowing water quantity may be quickly reduced when the heat load is reduced so as to improve the adjusting efficiency, and the opening degree of the energy balancing valve may be increased through the setting of the temperature controller when the heat load is increased to increase the water quantity, so as to improve the comfortableness.

Step a includes: detecting the flow in each water return branch pipe, adjusting the opening degree of each regional flow balancing valve according to the branch pipe set flow value, detecting the return water temperature in each water return branch pipe after the flow in the water return branch pipe is smaller than or equal to the branch pipe set flow value, and adjusting the opening degree of each regional flow balancing valve according to the branch pipe return water set temperature value. Each regional flow balancing valve is subjected to flow control, the opening degree of the valve is adjusted with the aid of the return water temperature on the basis of meeting the flow control requirement, and when the heat load is transferred between different circulating water branches, the adjusting efficiency may be improved, the time for achieving a balance may be shortened, then the water quantity is reduced, and the energy is saved.

Step b further includes simultaneously running step b2: detecting return water flow in the water return pipe of each of the fresh air units and the air handling units, adjusting the opening degree of each tail-end flow balancing valve according to a tail-end set flow value, detecting return water temperature in the water return pipe of each of the fresh air units and the air handling units after the flow in the water return pipe of each of the fresh air units and the air handling units is smaller than or equal to the tail-end set flow value, adjusting the opening degree of each tail-end flow balancing valve according to the return water set temperature value, detecting the room temperature after the return water temperature in the water return pipe of each of the fresh air units and the air handling units is greater than or equal to the tail-end return water set temperature value, and adjusting, by each temperature controller, the opening degree of each tail-end flow balancing valve. The fresh air units and the air handling units are large-sized heat exchange devices and require much energy; the maximum flow control is first performed, so that the adjusting efficiency may be improved; when the detected flow value is smaller than the design value, a temperature control stage may be performed, and the flowing water quantity is adjusted through the return water temperature and the room temperature, so that the adjusting time may be shortened and then the consumption of energy may be reduced.

The present invention has the following advantages: 1, the problem of heat unevenness caused by static and dynamic imbalance is solved, so that the system is more stable, the heat exchange efficiency and the air supply effect of unit tail ends are directly controlled, and the comfortableness is improved;

2, since the whole water system is balanced and subjected to frequency conversion control, the refrigerating unit and the water pumps run in the most efficient working state, and the furthest energy-saving effect is realized;

3, the design workload is reduced; a reverse return type delivery pipe network is used, so that fussy hydraulic balance calculation is not needed for the pipe network, the design difficulty is reduced, and the complex debugging operation is simplified into simple flow distribution and energy scheming;

4, for a construction unit, reverse return pipelines do not need to be installed, and the system does not need to be debugged, so that the project cost, a large amount of time and the used area and space are saved, the consumption of energy is reduced and the economic benefit is improved; and 5, since the flow balance and energy balance of the water system are automatically performed, the cooling and heating working conditions are automatically converted and the frequency conversion energy-saving operation is also automatically adjusted, the probability of man-made misoperation is avoided.

1, refrigerating unit; 2, evaporator; 3, condenser; 4, circulating water pump; 5, cooling water pump; 6, circulating water return temperature sensor; 7, circulating water inlet temperature sensor; 8, cooling water inlet temperature sensor; 9, cooling water return temperature sensor; 10, regional flow balancing valve; 11, water collector; 12, water distributor; 13, air handling unit; 14, room; 15, energy balancing valve; 16, tail-end fan coil; 17, fresh air unit; 18, cooling water pump frequency converter; 19, circulating water pump frequency converter; 20, cooling tower; 21, differential pressure sensor; 22, by-pass valve; 23, temperature controller; 24, shunt protection device; 25, water inlet manifold; 26, water return manifold; 27, water inlet branch pipe; 28, water return branch pipe; 29, tail-end return water temperature sensor; 30, branch pipe return water temperature sensor; 31, tail-end flow balancing valve.

DETAILED DESCRIPTION OF THE INVENTION

Since a central air-conditioning system is already very common, e.g. devices such as a fan coil, an air handling unit, a refrigerating unit and a water pump are all common devices in the prior art, the contents of the present invention will not be further described in detail.

Embodiment 1

Figure 1:
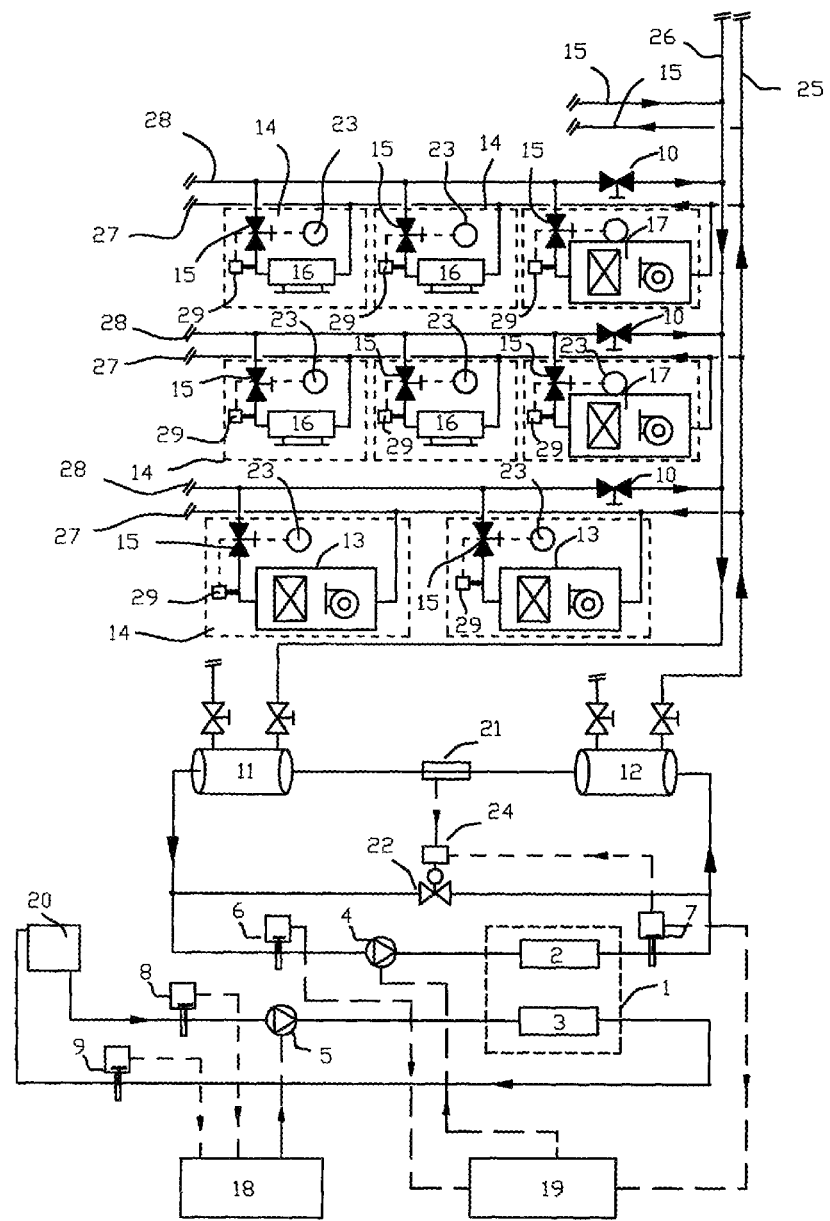
FIG. 1 is a structural schematic diagram of embodiment 1 of the present invention.

Refer to FIG. 1. A central air-conditioning system comprises a refrigerating unit 1, a cooling water loop, a cooling water pump 5 arranged on the cooling water loop, a cooling water pump frequency converter 18, a circulating water loop, a circulating water pump 4 arranged on the circulating water loop, a circulating water pump frequency converter 19, a plurality of circulating water branches arranged in parallel on the circulating water loop as well as temperature controllers 23, tail-end fan coils 16, fresh air units 17 and air handling units 13 arranged in rooms 14, the circulating water loop includes a water inlet manifold 25 and a water return manifold 26, and each circulating water branch includes a water inlet branch pipe 27 and a water return branch pipe 28; the tail-end fan coils 16, the fresh air units 17 and the air handling units 13 are arranged in parallel on the circulating water branches respectively; a regional flow balancing valve 10 for controlling the flow of each water return branch pipe is arranged on each water return branch pipe 28, and an energy balancing valve 15 is arranged on a water return pipe of each tail-end fan coil 16 and respectively receives signals output by the temperature controller 23 and a tail-end return water temperature sensor 29 which is arranged on the water return pipe of the tail-end fan coil 16. When the central air-conditioning system is applied to a refrigerating condition, different regions are divided according to the characteristics of buildings, e.g. according to different buildings or different floors of the same building, the regional flow balancing valve 10 is arranged on each regional water return branch pipe, and the flow of each water return branch pipe is detected through a flow sensor therein and compared with a set flow value to adjust the opening degree of the valve, so that the flow of each branch pipe is limited within a design value.

An energy balancing valve 15 is arranged on a water return pipe of each of the tail-end fan coil 16, the air handling unit 13 and the fresh air unit 17 in each regional room 14, a tail-end return water temperature sensor 29 is arranged on the water return pipe of each tail-end device, and the opening degree of each energy balancing valve 15 is adjusted by comparing the return water temperature detected by the tail-end return water temperature sensor 29 with the set value, so that ensure that the return water temperature of the water return pipe of each tail-end device is greater than or equal to the set value, it is ensured that the heat exchange supply of the tail-end fan coils 16, the air handling units 13 and the fresh air units 17 is consistent with the load demand, the efficiency is the highest at the moment, and then the opening degree of the valve is finely adjusted according to the instruction given by the room temperature controller 23, so that the tail-end flow meets the requirement of comfortableness.

Figure 2:
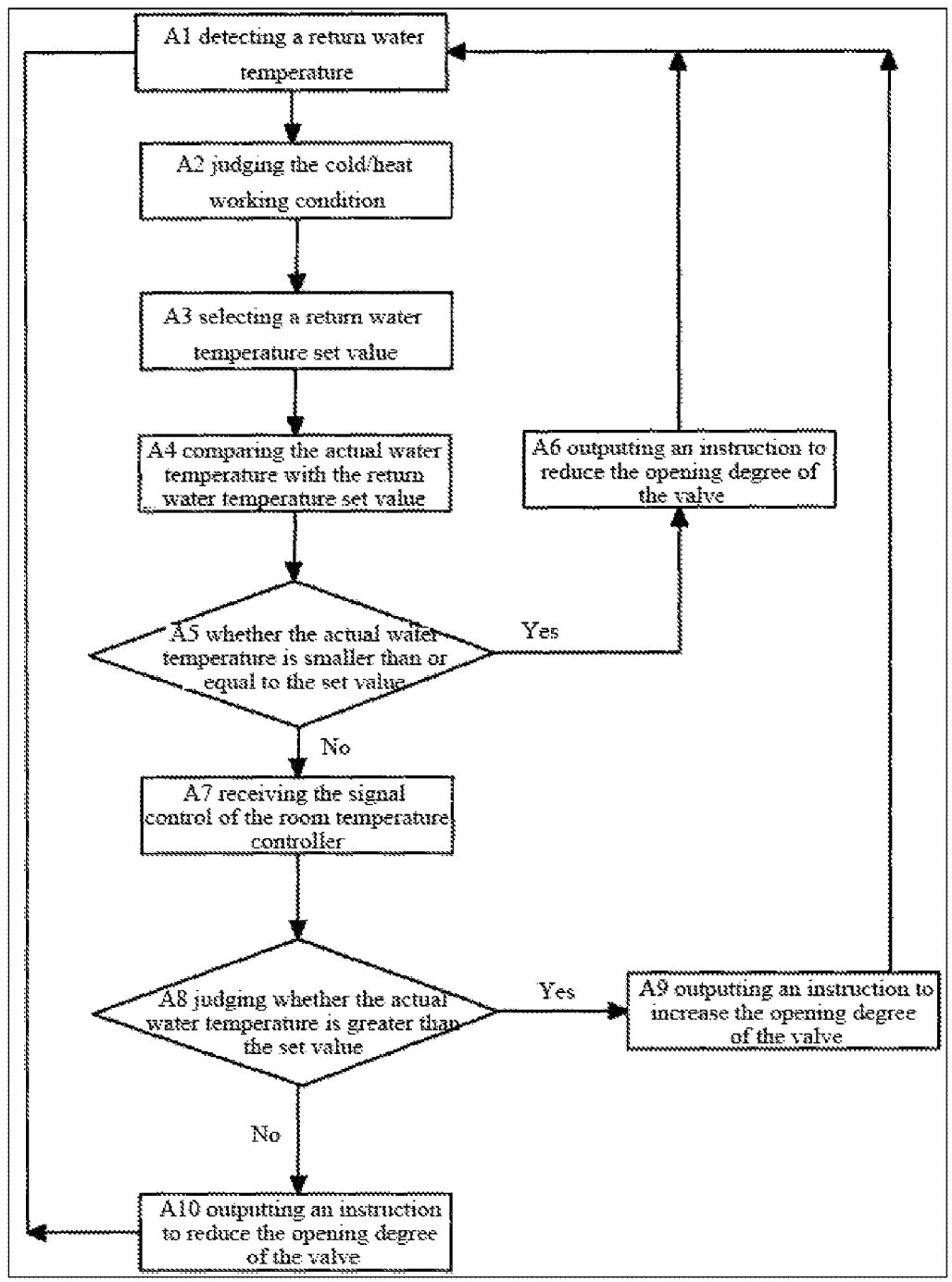
FIG. 2 is a control principle diagram of energy balancing valves in embodiment 1 of the present invention.

Refer to FIG. 2, which is an adjusting principle diagram of each energy balancing valve 15, including the following steps:

A1, detecting a tail-end return water temperature, acquiring the actual water temperature through the tail-end return water temperature sensor, and entering next step;

A2, judging the cold/heat working condition, and entering next step;

A3, selecting a return water temperature set value according to the cold/heat working condition, and entering next step;

A4, comparing the actual water temperature with the return water temperature set value, and entering next step;

A5, judging whether the actual water temperature is smaller than or equal to the set value, if so, entering step A6, otherwise, entering step A7;

A6, outputting an instruction to reduce the opening degree of the valve, and returning to step A1;

A7, receiving the signal control of the room temperature controller, resetting the return water temperature set value as a temperature controller set value, and entering next step;

A8, judging whether the actual water temperature is greater than the set value, if so, entering step A9, otherwise, entering step A10;

A9, outputting an instruction to increase the opening degree of the valve, and returning to step A1; and A10, outputting an instruction to reduce the opening degree of the valve, and returning to step A1.

The refrigerating unit 1 arranged on the circulating water loop mainly includes an evaporator 2 and a condenser 3. A cooling water inlet temperature sensor 8 inserted onto a water inlet pipeline of the condenser 3 and a cooling water return temperature sensor 9 inserted onto a water outlet pipeline of the condenser 3 send detected water temperature signals to the cooling water pump frequency converter 18, and the cooling water pump 5 positioned on the circulating water loop and connected with the condenser 3 is controlled by the output of the cooling water pump frequency converter 18, so that the working efficiency of the cooling water pump 5 is controlled. Similarly, a circulating water return temperature sensor 6 inserted onto a water inlet pipeline of the evaporator 2 and a circulating water inlet temperature sensor 7 inserted onto a water outlet pipeline of the evaporator 2 send detected water temperature signals to the circulating water pump frequency converter 19, and the circulating water pump 4 positioned on the circulating water loop and connected with the evaporator 2 is controlled by the output of the circulating water pump frequency converter 19, so that the working efficiency of the circulating water pump 4 is controlled. A cooling tower 20 connected to the cooling water loop cools water after heat exchange of the condenser. A differential pressure sensor 21 is connected between the water collector 11 and the water distributor 12 which are connected to the circulating water loop, the shunt protection device 24 receives signals of the differential pressure sensor 21 and the temperature sensor 7, and a by-pass valve 22 arranged between the water supply and return loops is controlled by the output of the shunt protection device, so that safe use of a main unit and normal operation of pipelines are ensured.

Embodiment 2

Figure 3:
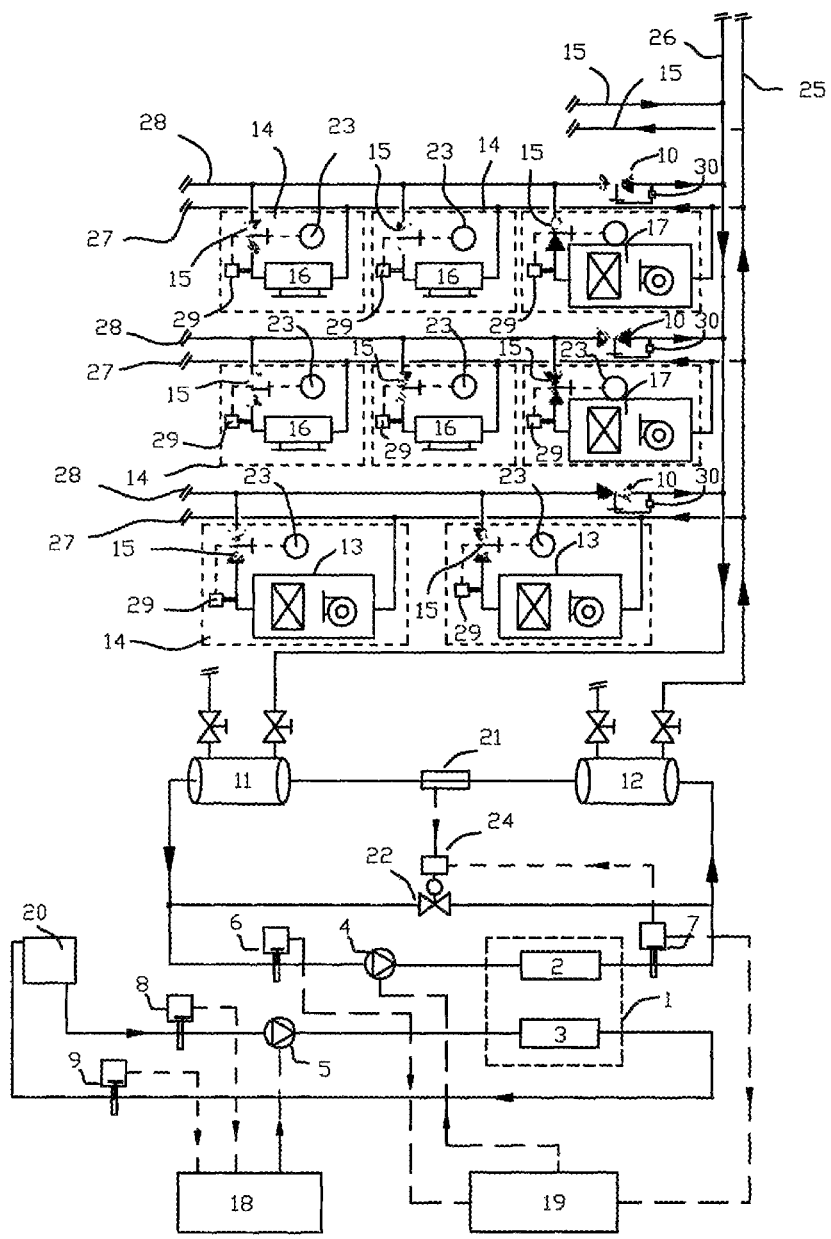
FIG. 3 is a structural schematic diagram of embodiment 2 of the present invention.

Refer to FIG. 3. A central air-conditioning system comprises a refrigerating unit 1, a cooling water loop, a cooling water pump 5 arranged on the cooling water loop, a cooling water pump frequency converter 18, a circulating water loop, a circulating water pump 4 arranged on the circulating water loop, a circulating water pump frequency converter 19, a plurality of circulating water branches arranged in parallel on the circulating water loop, as well as temperature controllers 23, tail-end fan coils 16, fresh air units 17 and air handling units 13 arranged in rooms 14, wherein the circulating water loop includes a water inlet manifold 25 and a water return manifold 26, and each circulating water branch includes a water inlet branch pipe 27 and a water return branch pipe 28; the tail-end fan coils 16, the fresh air units 17 and the air handling units 13 are arranged in parallel on the circulating water branches respectively; a regional flow balancing valve 10 for controlling the flow of each water return branch pipe is arranged on each water return branch pipe 28, and an energy balancing valve 15 is arranged on a water return pipe of each tail-end fan coil 16 and respectively receives signals output by the temperature controller 23 and a tail-end return water temperature sensor 29 which is arranged on the water return pipe of the tail-end fan coil 16. A branch pipe return water temperature sensor 30 is arranged on each water return branch pipe 28, and the regional flow balancing valves 10 receive signals output by the branch pipe return water temperature sensors 30.

When the central air-conditioning system is applied to a refrigerating condition, different regions are divided according to the characteristics of buildings, e.g. according to different buildings or different floors of the same building, the regional flow balancing valve 10 is arranged on each regional water return branch pipe, and the flow of each water return branch pipe is detected through a flow sensor therein and compared with a set flow value to adjust the opening degree of the valve, so that the flow of each branch pipe is limited within a design value.

Figure 4:
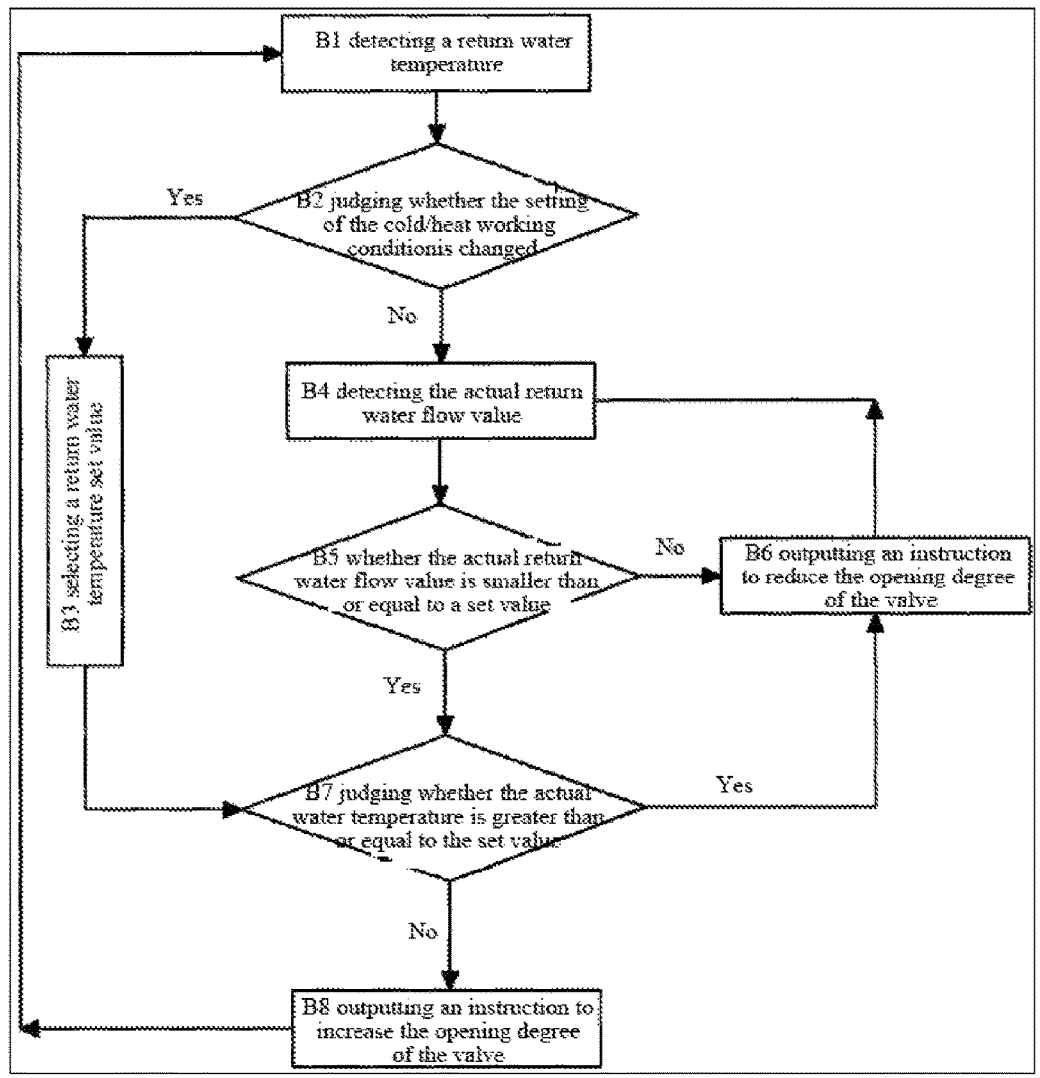
FIG. 4 is a control principle diagram of regional flow balancing valves in embodiment 2 of the present invention.

Refer to FIG. 4, which is a control principle diagram of each regional flow balancing valve, including the following steps:

B1, detecting a return water temperature in each water return branch pipe, acquiring the actual water temperature through each branch pipe return water temperature sensor, and entering next step;

B2, judging whether the setting of the cold/heat working condition is changed, if so, entering step B3, otherwise, entering step B4;

B3, selecting a return water temperature set value according to the current cold/heat working condition, and entering step B7;

B4, detecting the actual return water flow value, and entering next step;

B5, comparing whether the actual return water flow value is smaller than or equal to a set value, if so, entering step B7, otherwise, entering step B6;

B6, outputting an instruction to reduce the opening degree of the valve, and returning to step B4;

B7, comparing whether the actual water temperature is greater than or equal to the return water temperature set value, if not, entering step B6, otherwise, entering step B8; and B8, outputting an instruction to increase the opening degree of the valve, and returning to step B1.

An energy balancing valve 15 is arranged on a water return pipe of each of the tail-end fan coil 16, the air handling unit 13 and the fresh air unit 17 in each regional room 14, a tail-end return water temperature sensor 29 is arranged on the water return pipe of each tail-end device, and the opening degree of each energy balancing valve 15 is adjusted by comparing the return water temperature detected by the tail-end return water temperature sensor 29 with the set value, so that the return water temperature of the water return pipe of each tail-end device is greater than or equal to the set value, it is ensured that the heat exchange supply of the tail-end fan coils 16, the air handling units 13 and the fresh air units 17 is consistent with the load demand, the efficiency is the highest at the moment, and then the opening degree of the valve is finely adjusted according to the instruction given by the room temperature controller 23, so that the tail-end flow meets the requirement of comfortableness.

The adjusting principle of each energy balancing valve 15 is the same as that in embodiment 1, and is not repeatedly described herein.

The refrigerating unit 1 arranged on the circulating water loop mainly includes an evaporator 2 and a condenser 3. A cooling water inlet temperature sensor 8 inserted onto a water inlet pipeline of the condenser 3 and a cooling water return temperature sensor 9 inserted onto a water outlet pipeline of the condenser 3 send detected water temperature signals to the cooling water pump frequency converter 18, and the cooling water pump 5 positioned on the circulating water loop and connected with the condenser 3 is controlled by the output of the cooling water pump frequency converter 18, so that the working efficiency of the cooling water pump 5 is controlled. Similarly, a circulating water return temperature sensor 6 inserted onto a water inlet pipeline of the evaporator 2 and a circulating water inlet temperature sensor 7 inserted onto a water outlet pipeline of the evaporator 2 send detected water temperature signals to the circulating water pump frequency converter 19, and the circulating water pump 4 positioned on the circulating water loop and connected with the evaporator 2 is controlled by the output of the circulating water pump frequency converter 19, so that the working efficiency of the circulating water pump 4 is controlled. A cooling tower 20 connected to the cooling water loop cools water after heat exchange of the condenser. A differential pressure sensor 21 is connected between the water collector 11 and the water distributor 12 which are connected to the circulating water loop, the shunt protection device 24 receives signals of the differential pressure sensor 21 and the temperature sensor 7, and a by-pass valve 22 arranged between the water supply and return loops is controlled by the output of the shunt protection device 24, so that safe use of a main unit and normal operation of pipelines are ensured.

Embodiment 3

Figure 5:
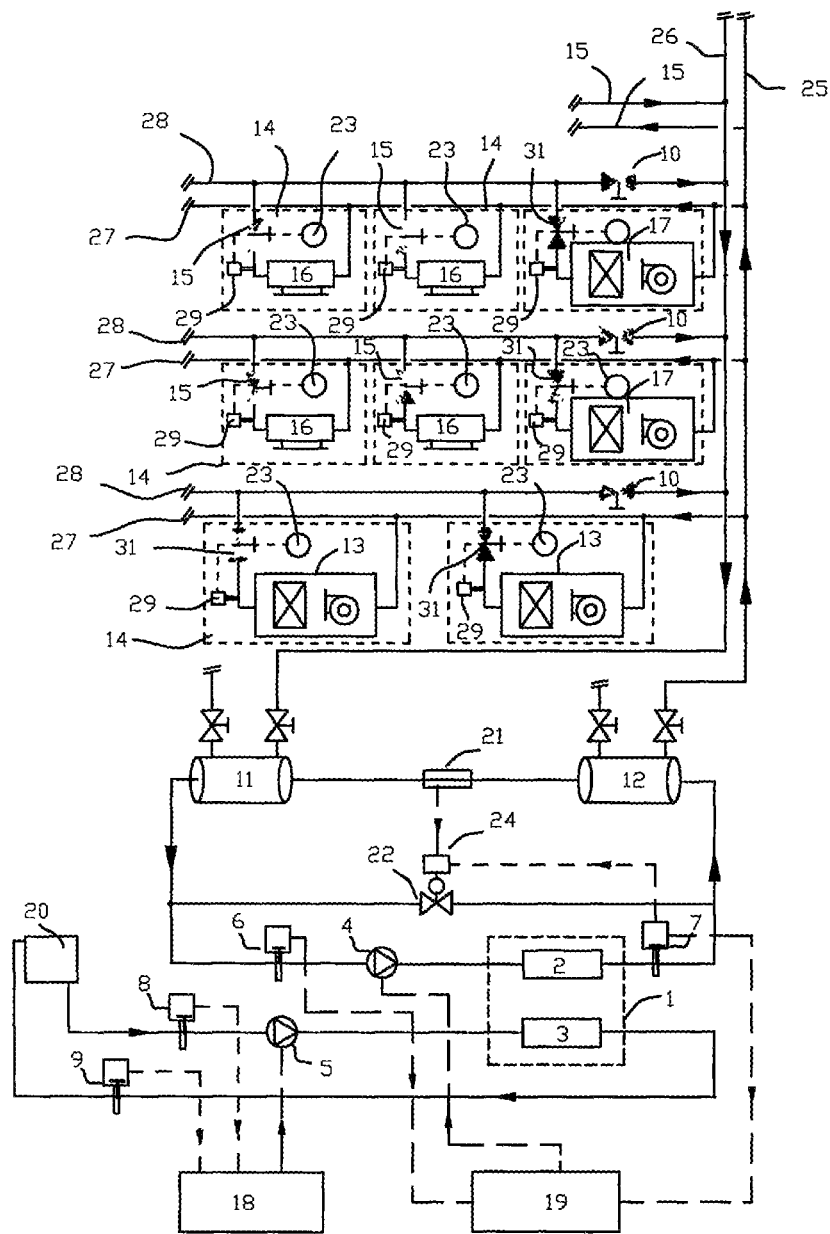
FIG. 5 is a structural schematic diagram of embodiment 3 of the present invention.

Refer to FIG. 5, which shows another central air-conditioning system, comprising a refrigerating unit 1, a cooling water loop, a cooling water pump 5 arranged on the cooling water loop, a cooling water pump frequency converter 18, a circulating water loop, a circulating water pump 4 arranged on the circulating water loop, a circulating water pump frequency converter 19, a plurality of circulating water branches arranged in parallel on the circulating water loop, as well as temperature controllers 23, tail-end fan coils 16, fresh air units 17 and air handling units 13 arranged in rooms 14, wherein the circulating water loop includes a water inlet manifold 25 and a water return manifold 26, and each circulating water branch includes a water inlet branch pipe 27 and a water return branch pipe 28; the tail-end fan coils 16, the fresh air units 17 and the air handling units 13 are arranged in parallel on the circulating water branches respectively; a regional flow balancing valve 10 for controlling the flow of each water return branch pipe is arranged on each water return branch pipe 28, and an energy balancing valve 15 is arranged on a water return pipe of each tail-end fan coil 16 and respectively receives signals output by the temperature controller 23 and a tail-end return water temperature sensor 29 which is arranged on the water return pipe of the tail-end fan coil 16.

When the central air-conditioning system is applied to a refrigerating condition, different regions are divided according to the characteristics of buildings, e.g. according to different buildings or different floors of the same building, the regional flow balancing valve 10 is arranged on each regional water return branch pipe, and the flow of each water return branch pipe is detected through a flow sensor therein and compared with a set flow value to adjust the opening degree of the valve, so that the flow of each branch pipe is limited within a design value.

An energy balancing valve 15 is arranged on the water return pipe of each tail-end fan coil 16 in each regional room 14, a tail-end flow balancing valve 31 is arranged on the water return pipe of each of the air handling units 13 and the fresh air units 17, a tail-end return water temperature sensor 29 is arranged on the water return pipe of each tail-end device, and the opening degree of each energy balancing valve 15 is adjusted by comparing the return water temperature detected by the tail-end return water temperature sensor 29 with a set value, so that the return water temperature of the water return pipe of each tail-end device is greater than or equal to the set value, it is ensured that the heat exchange supply of the tail-end fan coils 16 is consistent with the load demand, the efficiency the is highest at the moment, and then the opening degree of the valve is finely adjusted according to the instruction given by the room temperature controller 23, so that the tail-end flow meets the requirement of comfortableness.

Figure 6:
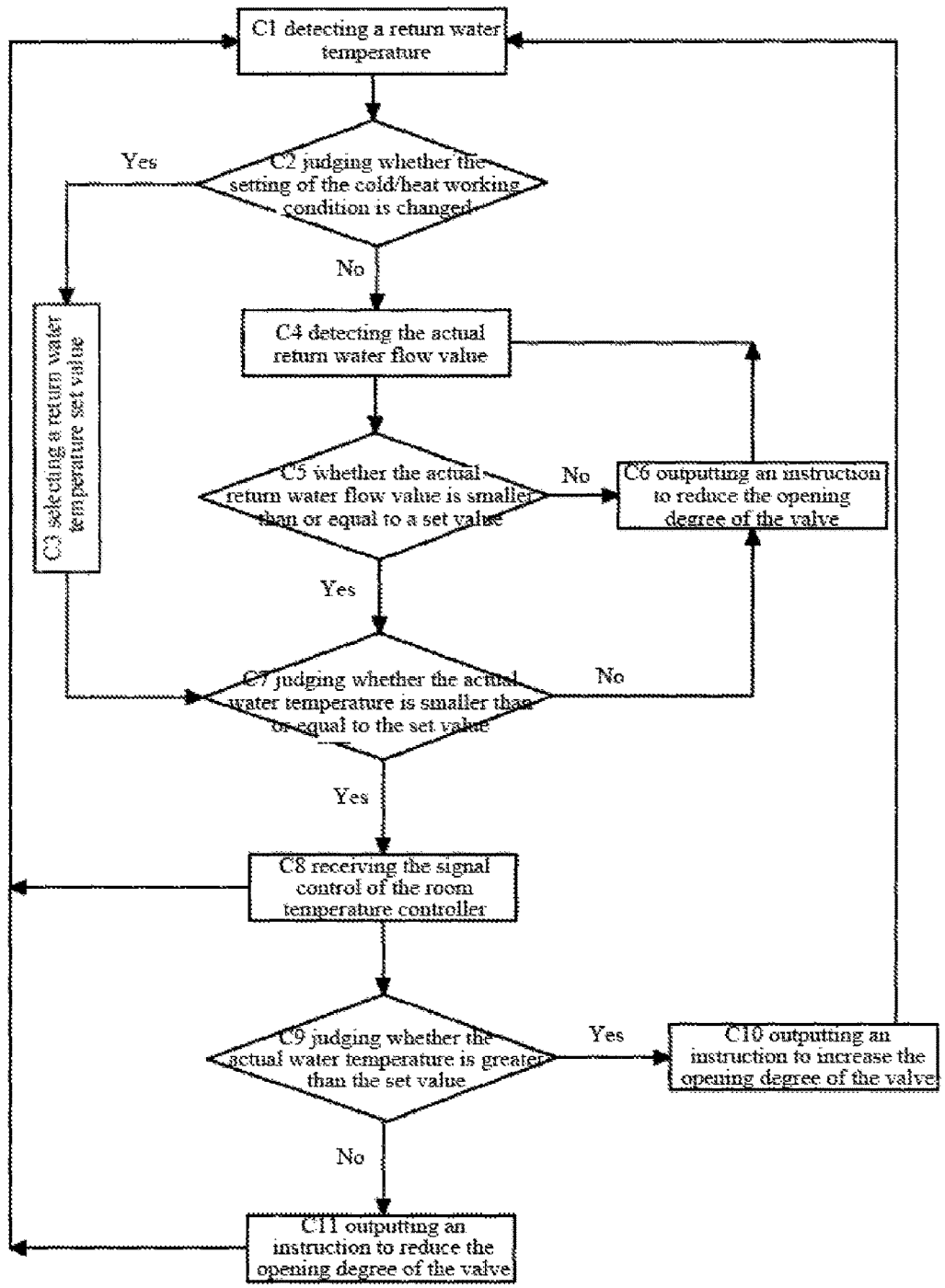
FIG. 6 is a control principle diagram of a tail-end flow balancing valve in embodiment 3 of the present invention.

Refer to FIG. 6, which is a control principle diagram of each tail-end flow balancing valve 31, including the following steps:

C1, detecting a return water temperature in each water return pipe, acquiring the actual water temperature through each tail-end return water temperature sensor, and entering next step;

C2, judging whether the setting of the cold/heat working condition is changed, if so, entering step C3, otherwise, entering step C4;

C3, selecting a return water temperature set value according to the current cold/heat working condition, and entering step C7;

C4, detecting the actual return water flow value, and entering next step;

C5, comparing whether the actual return water flow value is smaller than or equal to a set value, if so, entering step C7, otherwise, entering step C6;

C6, outputting an instruction to reduce the opening degree of the valve, and returning to step C4;

C7, comparing whether the actual water temperature is smaller than or equal to the return water temperature set value, if not, entering step C6, otherwise, entering step C8;

C8, receiving the signal control of the room temperature controller, resetting the return water temperature set value as a temperature controller set value, and entering next step;

C9, judging whether the actual water temperature is greater than the set value, if so, entering step C10, otherwise, entering step C11;

C10, outputting an instruction to increase the opening degree of the valve, and returning to step C1; and C11, outputting an instruction to reduce the opening degree of the valve, and returning to step C1.

The refrigerating unit 1 arranged on the circulating water loop mainly includes an evaporator 2 and a condenser 3. A cooling water inlet temperature sensor 8 inserted onto a water inlet pipeline of the condenser 3 and a cooling water return temperature sensor 9 inserted onto a water outlet pipeline of the condenser 3 send detected water temperature signals to the cooling water pump frequency converter 18, and the cooling water pump 5 positioned on the circulating water loop and connected with the condenser 3 is controlled by the output of the cooling water pump frequency converter 18, so that the working efficiency of the cooling water pump 5 is controlled. Similarly, a circulating water return temperature sensor 6 inserted onto a water inlet pipeline of the evaporator 2 and a circulating water inlet temperature sensor 7 inserted onto a water outlet pipeline of the evaporator 2 send detected water temperature signals to the circulating water pump frequency converter 19, and the circulating water pump 4 positioned on the circulating water loop and connected with the evaporator 2 is controlled by the output of the circulating water pump frequency converter 19, so that the working efficiency of the circulating water pump 4 is controlled. A cooling tower 20 connected to the cooling water loop cools water after heat exchange of the condenser. A differential pressure sensor 21 is connected between the water collector 11 and the water distributor 12 which are connected to the circulating water loop, the shunt protection device 24 receives signals of the differential pressure sensor 21 and the temperature sensor 7, and a by-pass valve 22 arranged between the water supply and return loops is controlled by the output of the shunt protection device 24, so that safe use of a main unit and normal operation of pipelines are ensured.

The beneficial effects of the present invention will be further described below through experiments.

The test environment is a two-floor commercial office building which includes a hall, a meeting room, offices and a small warehouse. A central air-conditioning system is mainly used for meeting the requirement of refrigeration in summer, the cold supply area is 1740 m$^2$, and the number of permanent persons is 151. The environment is divided into three regions, the hall and the meeting room are regarded as the first region, the offices are regarded as the second region, the warehouse is regarded as the third region, a circulating water branch pipe is arranged in each region, the tail-end fan coil in each room is connected in parallel to the circulating water branch pipe of each region. Three SPV020F80 type regional flow balancing valves produced by Guangzhou SINRO (Fogang) Air-Conditioning & Chiller Equipment Co., Ltd. are arranged on each regional water return branch pipe; 24 SEV01G20 type energy balancing valves produced by Guangzhou SINRO (Fogang) Air-Conditioning & Chiller Equipment Co., Ltd. are arranged on the water return pipeline of each tail-end device; the temperature controller in each room sets the temperature at 25° C., and the tail-end cold supply water temperature is set on the basis that the inlet water is 7° C. and the return water is 12° C.; a total flow meter for detecting the water quantity for cold supply is arranged on a circulating water manifold, the circulating water pump and the cooling water pump are GD65-30 type water pumps produced by GUANGYI PUMP, the electric energy meter is a DT862 type three-phase four-wire watt-hour meter produced by Shanghai Hayi, and the timer is a (Xinling) ZN4896 type multifunctional time relay produced by Xinling Electrical Co., Ltd.

Operating data are selected below for description:

Experiment 1

Environmental (dry and wet bulb) temperature: 30° C. and 26.9° C. recorded at 11 o'clock, 33.5° C. and 27° C. recorded at 16 o'clock,

|  |  | recording time | | | | | | | | | |
|---|---|---|---|---|---|---|---|---|---|---|---|
|  |  | 8:15 | 8:30 | 9:00 | 10:00 | 11:00 | 12:00 | 14:00 | 15:00 | 16:00 | 17:00 |
| running time (h) | | 0.43 | 0.67 | 1.27 | 2.32 | 3.35 | 4.17 | 6.2 | 7.08 | 8.23 | 9.15 |
| temperature difference (° C.) | return water | 32.4 | 20 | 14.5 | 12.9 | 12.5 | 11 | 11.3 | 12 | 12.3 | 10.5 |
| transmitting reading | effluent | 29 | 16.2 | 11 | 8.9 | 9.7 | 7.2 | 7.5 | 9 | 9.6 | 6.4 |
| frequency converter reading | voltage | E00 | E00 | 10 | 10 | 10 | 8.2 | 7.6 | 10 | 10 | 8.4 |
|  | frequency | 50 | 42.9 | 48.8 | 50 | 50 | 40.5 | 39.7 | 50 | 50 | 41.6 |
|  | current | 8.1 | 8.3 | 8.3 | 7.8 | 7.5 | 4.2 | 3.7 | 7.7 | 8 | 5.3 |
|  | torque | 96.7 | 97.5 | 94.8 | 92 | 89.3 | 41.4 | 35 | 92.1 | 95.2 | 55.6 |
| electric energy meter reading (kWh) | | 1259 | 1260 | 1263 | 1268.3 | 1272.6 | 1275.3 | 1278.6 | 1280.8 | 1283.2 | 1284.6 |
| flow value (m³) | | 25.6 | 26.1 | 24.5 | 5 | 21.3 | 16.3 | 13.2 | 23.3 | 23.5 | 16.3 |

Each of the circulating water pump and the cooling water pump consumes 3.6 kWh per hour, runs 9 hours every day and consumes 32.4 kWh in a day under a power frequency, and consumes 2.94 kWh per hour, runs 9 hours every day and consumes 26.46 kWh in a day under a frequency conversion state after the method of the present invention is adopted, so that compared with those in the power frequency state, the electricity is saved by 5.94 kWh, and the energy is saved by 18.3%.

Experiment 2

Environmental (dry and wet bulb) temperature: 27° C. and 21.5° C. recorded at 12 o'clock, 28.5° C. and 21.5° C. recorded at 15 o'clock, 27.9° C. and 20.6° C. recorded at 17 o'clock

|  |  | running time (h) | | | | | | |
|---|---|---|---|---|---|---|---|---|
|  |  | 261.68 | 262.87 | 263.82 | 265.33 | 266.35 | 267.55 | 268.30 |
| temperature difference | return water | 11.7 | 11.2 | 10.8 | 10.2 | 11.1 | 10.6 | 11.2 |
| transmitting reading | effluent | 7.6 | 7.8 | 7.9 | 6.4 | 7.6 | 7.1 | 10.7 |
| frequency converter reading | voltage | 9.6 | 6.8 | 6.4 | 7.4 | 6.8 | 6.6 | 6 |
|  | frequency | 48.6 | 34.4 | 32.3 | 37.4 | 34.3 | 33.3 | 30.3 |
|  | current | 6.9 | 4.8 | 4.5 | 4.3 | 4.5 | 4.3 | 3.7 |
|  | torque | 83.5 | 41.2 | 37 | 39.5 | 38.4 | 36.3 | 27.5 |
| electric energy meter reading | | 2671.5 | 2673.8 | 2675.9 | 2678.1 | 2679.8 | 2681.8 | 2683.1 |
| flow value | | 22.7 | 11.7 | 12.6 | 9.9 | 10.3 | 12.1 | 8.06 |

Each of the circulating water pump and the cooling water pump consumes 3.6 kWh per hour, runs 8 hours every day and consumes 28.8 kWh in a day under a power frequency, and consumes 1.75 kWh per hour, runs 8 hours every day and consumes 14 kWh in a day under a frequency conversion state after the method of the present invention is adopted, so that compared with the power frequency state, the electricity is saved by 14.8 kWh every day, and the energy is saved by 51.4%.

The above detailed description is specific description of the feasible embodiments of the present invention, the embodiments are not used for limiting the patent range of the present invention, and all equivalent implementations or alterations made without departing from the present invention should be included within the patent range of the present.

The invention claimed is:

1. A central air-conditioning system, comprising:
   a refrigerating unit;
   a cooling water loop;
   a cooling water pump arranged on the cooling water loop;
   a cooling water pump frequency converter;
   a circulating water loop including a water inlet manifold and a water return manifold;
   a circulating water pump arranged on the circulating water loop;
   a circulating water pump frequency converter;

a plurality of circulating water branches arranged in parallel on the circulating water loop, each of the plurality of circulating water branches including a water inlet branch pipe and a water return branch pipe;

temperature controllers, fan coils, fresh air units and air handling units arranged in rooms, with the fan coils and the fresh air units being arranged in parallel on the same respective circulating water branches;

a regional flow balancing valve for controlling the flow of each water return branch pipe arranged on each water return branch pipe;

energy balancing valves, each arranged on a water return pipe of each fan coil and receiving signals output by respective ones of the temperature controllers; and a plurality of tail-end return water temperature sensors including a respective tail-end return water temperature sensor arranged on the respective water return pipe of each fan coil.

2. The central air-conditioning system of claim 1, wherein other energy balancing valves are respectively arranged on the water return pipes of the fresh air units and the air handling units and respectively receive signals output by the temperature controllers and tail-end return water temperature sensors that are arranged on the respective water return pipes of the fresh air units and the air handling units.

3. The central air-conditioning system of claim 1, wherein branch pipe return water temperature sensors are arranged on the water return branch pipes, and the regional flow balancing valves receive signals output by the branch pipe return water temperature sensors.

4. The central air-conditioning system of claim 1, wherein tail-end flow balancing valves for controlling return water flow are arranged on the water return pipes of the fresh air units and the air handling units and respectively receive signals output by the temperature controllers and tail-end return water temperature sensors that are arranged on the respective water return pipes of the fresh air units and the air handling units.

5. The central air-conditioning system of claim 2, wherein branch pipe return water temperature sensors are arranged on the water return branch pipes, and the regional flow balancing valves receive signals output by the branch pipe return water temperature sensors.

6. A control method for a central air-conditioning system including a refrigerating unit, a cooling water loop, a cooling water pump arranged on the cooling water loop, a cooling water pump frequency converter, a circulating water loop having a water inlet manifold and a water return manifold, a circulating water pump arranged on the circulating water loop, a circulating water pump frequency converter, a plurality of circulating water branches arranged in parallel on the circulating water loop, each of the plurality of circulating water branches including a water inlet branch pipe and a water return branch pipe, temperature controllers, fan coils, fresh air units and air handling units arranged in rooms, the fan coils and the fresh air units being arranged in parallel on the same respective circulating water branches, a regional flow balancing valve for controlling the flow of each water return branch pipe arranged on each water return branch pipe, an energy balancing valve arranged on a water return pipe of each fan coil that respectively receives signals output by respective ones of the temperature controllers, and a plurality of tail-end return water temperature sensors including a respective tail-end return water temperature sensor arranged on the respective water return pipe of each fan coil, said control method comprising the steps, performed simultaneously or sequentially, of:

(a) detecting the flow in each water return branch pipe, and adjusting the opening degree of each regional flow balancing valve according to a branch pipe set flow value, so that the flow in the water return branch pipe is smaller than or equal to the branch pipe set flow value; and (b) detecting return water temperature in a water return pipe of each fan coil, adjusting the opening degree of each energy balancing valve according to a tail-end return water set temperature value, detecting the room temperature when the return water temperature in the water return pipe of each fan coil is greater than or equal to the tail-end return water set temperature value, and adjusting, by each temperature controller, the opening degree of each energy adjusting valve.

7. The control method for the central air-conditioning system of claim 6, wherein step (b) further comprises step (b1) detecting return water temperature in the water return pipe of each of the fresh air units and the air handling units, adjusting the opening degree of each energy balancing valve according to the tail-end return water set temperature value, detecting the room temperature when the return water temperature in the water return pipe of each of the fresh air units and the air handling units is greater than or equal to the tail-end return water set temperature value, and adjusting, by each temperature controller, the opening degree of each energy adjusting valve.

8. The control method for the central air-conditioning system of claim 6, wherein step (a) comprises detecting the flow in each water return branch pipe, adjusting the opening degree of each regional flow balancing valve according to the branch pipe set flow value, detecting the return water temperature in each water return branch pipe when the flow in the water return branch pipe is smaller than or equal to the branch pipe set flow value, and adjusting the opening degree of each regional flow balancing valve according to the branch pipe return water set temperature value.

9. The control method for the central air-conditioning system of claim 6, wherein step (b) further comprises simultaneously running step (b2) detecting return water flow in the water return pipe of each of the fresh air units and the air handling units, adjusting the opening degree of each tail-end flow balancing valve according to a tail-end set flow value, detecting return water temperature in the water return pipe of each of the fresh air units and the air handling units when the flow in the water return pipe of each of the fresh air units and the air handling units is smaller or equal to the tail-end set flow value, adjusting the opening degree of each tail-end flow balancing valve according to the return water set temperature value, detecting the room temperature when the return water temperature in the water return pipe of each of the fresh air units and the air handling units is greater than or equal to the tail-end return water set temperature value, and adjusting, by each temperature controller, the opening degree of each tail-end flow balancing valve.

10. The control method for the central air-conditioning system of claim 7, wherein step (a) comprises detecting the flow in each water return branch pipe, adjusting the opening degree of each regional flow balancing valve according to the branch pipe set flow value, detecting the return water temperature in each water return branch pipe when the flow in the water return branch pipe is smaller than or equal to the branch pipe set flow value, and adjusting the opening degree of each regional flow balancing valve according to the branch pipe return water set temperature value.

* * * * *